Nov. 24, 1936.  G. GARAND  2,061,964
LOCKING PIN FOR BRAKE SHOES
Filed April 19, 1935
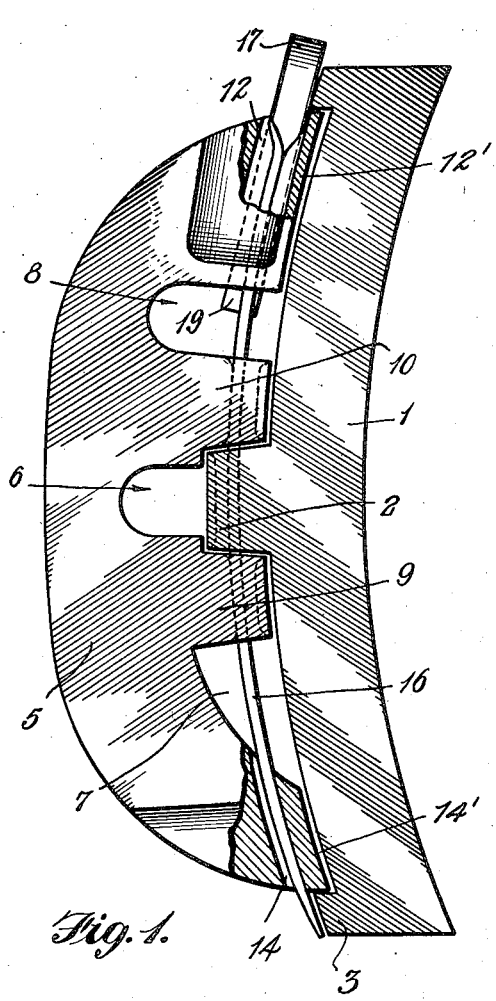
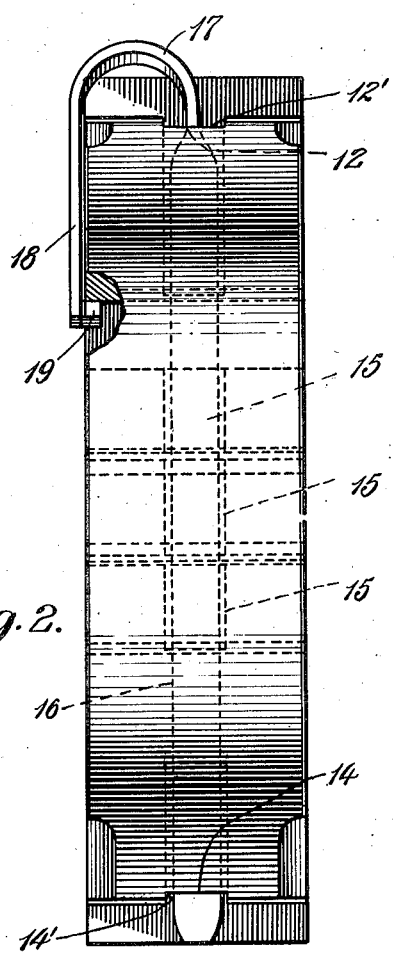
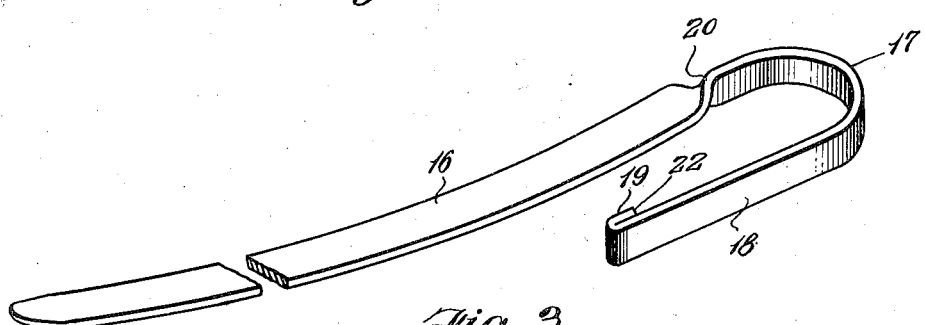
INVENTOR
George Garand,
BY Ralph T. Bassett
ATTORNEY Patented Nov. 24, 1936

2,061,964

UNITED STATES PATENT OFFICE 2,061,964

LOCKING PIN FOR BRAKE SHOES

George Garand, Champlain, N. Y.

Application April 19, 1935, Serial No. 17,345

10 Claims. (Cl. 188—243)

REISSUED

This invention relates to improvements in brake-shoe assemblies. Assemblies of this character include a brake-shoe provided with spaced lugs, a supporting head formed with recesses for receiving the lugs of the brake-shoe and a locking pin which extends through registering openings in the lugs of the brake-shoe and the supporting head for locking the parts together. Heretofore difficulty has been experienced in providing a locking pin for use in brake-shoe assemblies which would not become displaced due to vibration of the parts, as the accidental removal of a pin and the loss of a brake-shoe might readily result in material damage to both life and property.

The present invention comprehends a locking pin structure designed for use in the conventional brake assemblies, which, when in locking position, cannot be displaced due to vibration or other reasons apparent to one skilled in the art. More specifically the present locking pin includes an integral structure the elongated shank of which is shaped to seat in the registering openings formed in the shoe and in the supporting head, while the upper portion is curved outwardly and downwardly to form an intermediate handle portion and a spring lock arm, the latter cooperating with the supporting head to prevent displacement.

Other features will more clearly hereinafter appear by reference to the accompanying drawing forming a part of this specification and wherein like characters of reference designate corresponding parts throughout the several views, in which:

Figure 1 is a side elevation of a brake assembly with the pin in position.

Figure 2 is a rear elevation, and

Figure 3 is a perspective of the locking pin.

In the present disclosure a conventional brake-shoe is illustrated at 1, and includes a plurality of spaced lugs shown in the illustration to include intermediate lug 2 and end lugs 3. The supporting head 5 is provided with a central recess 6 and end recesses 7 and 8, these recesses defining the projections 9 and 10 between which the central lug 2 of the brake-shoe 1 is positioned in normal assembly. Aligned longitudinally extending openings are formed through the inter-locked lug and extensions. Also the extremities of the supporting head are formed with central longitudinal slots 12 and 14 and longitudinal ribs 12' and 14' projecting inwardly from the end lugs 3 seat in these slots to eliminate transverse relative movement of the parts. The foregoing defines generally the essential parts of one of the conventional types of brake-shoes and supporting head structures.

Referring now particularly to Figure 3, the locking pin will be seen to comprise an integral metallic body, preferably spring steel and includes an elongated shank 16, a curved handle 17, a locking shank arm 18 and hooked extremity 19. The shank of the locking pin is curved slightly and tapers gradually towards its extremity. At a point defining the upper extremity of the locking pin the body is twisted at right angles as shown at 20 and is curved outwardly and downwardly in inverted U-form to provide the handle portion 17 and the locking shank arm 18. The locking shank arm 18 is positioned laterally of the pin body 16 a distance approximating the space between the wall of the slot in the upper projection of the supporting head and the side face of this element.

As is common in such devices, the curved resilient shank 16 when inserted in the registering openings formed in the extensions of the supporting head and the central lug of the shoe tends to firmly fix these parts in position while the locking shank 18 projects downwardly along the side wall of the assembled parts and due to the resilient nature of the structure firmly grips this wall and retains the enlarged head portion 19 beneath the lower face of the upper end projection of the supporting head.

Normal vibration of the parts which might eventually tend to increase the play between contacting faces and thus increase the movement of the shank will not affect the locking engagement of the head 19 beneath the lower face of the upper extremity of the supporting head as the locking shank 18 due to the inverted U-shaped intermediate spring portion 17 will accommodate such wear and continue to seat fully beneath the wall face. The intermediate portion 17 not only functions to create the necessary resiliency in the locking shank 18 but provides a convenient element in the nature of a handle for use in inserting and removing the structure. It will be noted that the projecting portion 19 is formed by bending the extremity of the locking shaft 18 inward upon itself, the extremity being squared properly as shown at 22 to provide the necessary shoulder for engaging the cooperating part.

Minor details of construction can be made without departing from the spirit of the invention which comprehends broadly the use of an integral structure in the form of a locking pin having an offset latch portion at one extremity for resilient hooked engagement with a suitable co-acting wall portion. The structure of the pin as shown and defined provides a structure which will be comparatively simple and cheap to manufacture and which while incorporating the desirable features of the prior art add to those features a lock of such a character that its positive action will not be defected by wear between the intermediate inter-fitting parts.

It is, of course, comprehended that locking pins shall be made with the locking extremity projecting to either side of the pin shank to permit use of the device on both right and left hand brake-shoe assemblies.

What I claim as new and desire to secure by Letters Patent of the United States is:

1. A locking pin for brake-shoes including an elongated shank, a resilient arm spaced throughout its length from said shank having a hooked extremity and a connection between said shank and arm.

2. A locking pin for brake-shoes comprising an integral resilient body formed with an elongated shank, said body being twisted to right angles to define the upper extremity of said shank and curved outwardly and downwardly to form a spaced locking arm, and a hook carried by said locking arm.

3. A locking pin for brake-shoes including an elongated resilient metallic member bent to provide spaced long and short arms and an inverted U-shaped intermediate portion, the long arm being slightly curved and tapered to its extremity and the short arm being bent to form a hook.

4. The substance of claim 3 characterized in that the portion of the resilient metallic member intermediate the long and short arms is curved to provide a handle portion.

5. In combination with a brake-shoe having attached lugs, a supporting head formed with recesses to receive said lugs, a locking pin extending through the brake-shoe and head and formed with an offset downwardly extending portion, the downwardly extending portion being twisted substantially to right angles with the locking pin and terminating in an integral hook and a handle positioned between the locking pin and the downwardly extending portion.

6. A locking pin for brake-shoes comprising a body having a spaced rebent portion of less length than the body and terminating in an inwardly projecting hook.

7. The substance of claim 6 characterized in that the hook is formed by bending the short arm end portion inwardly upon itself.

8. In combination with a brake-shoe having attaching lugs, a supporting head formed with recesses to receive said lugs, a locking pin extending through the brake-shoe and head having a rebent portion terminating in a hook for engagement with the outer face of said supporting head.

9. A locking pin for brake-shoes comprising a body having a spaced rebent portion and a hook carried by the rebent portion extending inwardly toward the body.

10. In combination with a brake-shoe having attaching lugs, a supporting head formed with recesses to receive said lugs, a locking pin including an elongated body extending through the brake-shoe and head and formed with a downwardly extending portion spaced from the body, said downwardly extending portion being bent upon itself to provide a hook for engagement with said head.

GEORGE GARAND.